United States Patent
Geislinger

(10) Patent No.: US 10,836,457 B2
(45) Date of Patent: Nov. 17, 2020

(54) ELECTRICALLY DRIVEN HYDROFOIL

(71) Applicant: Ellergon Antriebstechnik Gesellschaft m.b.H., Hallwang (AT)

(72) Inventor: Cornelius Geislinger, Hallwang (AT)

(73) Assignee: ELLERGON ANTRIEBSTECHNIK GESELLSCHAFT M.B.H., Hallwang (AT)

(*) Notice: Subject to any disclaimer, the term of this patent is extended or adjusted under 35 U.S.C. 154(b) by 227 days.

(21) Appl. No.: 16/012,074

(22) Filed: Jun. 19, 2018

(65) Prior Publication Data

US 2018/0370600 A1 Dec. 27, 2018

(30) Foreign Application Priority Data

Jun. 21, 2017 (DE) ............... 20 2017 103 703 U

(51) Int. Cl.
| | |
|---|---|
| *B63B 32/10* | (2020.01) |
| *B63B 1/24* | (2020.01) |
| *B63B 32/60* | (2020.01) |
| *B63B 1/26* | (2006.01) |
| *B60L 53/80* | (2019.01) |
| *B60L 53/14* | (2019.01) |

(52) U.S. Cl.
CPC ............ *B63B 32/10* (2020.02); *B60L 53/14* (2019.02); *B60L 53/80* (2019.02); *B63B 1/242* (2013.01);
(Continued)

(58) Field of Classification Search
CPC .......... B63B 1/24; B63B 1/242; B63B 1/246; B63B 1/248; B63B 1/26; B63B 1/28;
(Continued)

(56) References Cited

U.S. PATENT DOCUMENTS

| | | | | |
|---|---|---|---|---|
| 7,047,901 | B2* | 5/2006 | Chen ............... | B63B 1/246 |
| | | | | 114/281 |
| 8,636,552 | B2* | 1/2014 | Braden ............ | B63H 21/17 |
| | | | | 440/6 |

(Continued)

FOREIGN PATENT DOCUMENTS

| | | |
|---|---|---|
| DE | 102014005314 A1 | 10/2015 |
| EP | 2 907 737 A1 | 8/2015 |

OTHER PUBLICATIONS

Extended European search report with the European search opinion issued for corresponding European Patent Application No. 18172452.7 dated Oct. 2, 2018.

*Primary Examiner* — Ajay Vasudeva
(74) *Attorney, Agent, or Firm* — Myers Wolin, LLC

(57) ABSTRACT

An electrically driven hydrofoil for fastening to a board in order to lift the board out of the water during travel operation, comprises at least one drive module, which as an autonomous unit is fastened to a portion of the hydrofoil that remains submerged in the water during travel operation, an electric battery, and an electrically operated propulsion device supplied with power by the battery. It is thus possible to equip a conventional hydrofoil and a corresponding hydrofoil board with an electric drive, without the need for modifications to the board or to the hydrofoil. The battery can be arranged in the drive module so that there will be no need to provide external electrical connection between the propulsion device and the battery. The drive module may thus form an autonomous unit that may be attached to the hydrofoil as required, but otherwise is separate from the hydrofoil.

17 Claims, 3 Drawing Sheets

(52) U.S. Cl.
CPC .............. *B63B 1/246* (2013.01); *B63B 1/248*
(2013.01); *B63B 1/26* (2013.01); *B63B 32/60*
(2020.02); *B60L 2200/32* (2013.01); *B60L*
*2200/46* (2013.01); *Y02T 90/14* (2013.01)

(58) Field of Classification Search
CPC ... B63B 2001/281; B63B 1/283; B63B 1/285;
B63B 1/286; B63B 1/30; B63B 32/00;
B63B 32/10; B63B 32/50; B63B 32/60
See application file for complete search history.

(56) References Cited

U.S. PATENT DOCUMENTS

| | | | |
|---|---|---|---|
| 9,359,044 B2 * | 6/2016 | Langelaan | B63B 32/60 |
| 10,099,754 B2 * | 10/2018 | Tian | B63B 32/10 |
| D843,303 S * | 3/2019 | Leason | D12/309 |
| 10,266,239 B2 * | 4/2019 | Fry | B63B 32/10 |
| 10,300,998 B2 * | 5/2019 | Terada | G05D 1/0206 |
| 10,358,194 B1 * | 7/2019 | Wengreen | B63B 32/10 |
| 10,486,771 B2 * | 11/2019 | Tian | B63B 1/286 |
| 10,597,118 B2 * | 3/2020 | Montague | B63H 1/22 |
| 2002/0124783 A1 * | 9/2002 | Dynes | B63B 34/10 |
| | | | 114/55.54 |
| 2003/0167991 A1 | 9/2003 | Namanny | |
| 2004/0139905 A1 | 7/2004 | Chen | |
| 2011/0111650 A1 | 5/2011 | Braden et al. | |
| 2012/0196494 A1 * | 8/2012 | Preston | B63B 32/10 |
| | | | 440/67 |
| 2015/0104985 A1 | 4/2015 | Langelaan | |
| 2018/0208286 A1 * | 7/2018 | MacFarlane | B63H 5/07 |

* cited by examiner

ELECTRICALLY DRIVEN HYDROFOIL

CROSS REFERENCE TO RELATED APPLICATIONS

This application claims priority under 35 USC § 119 to German Utility Model Application No. 20 2017 103 703.7, filed on Jun. 21, 2017, the contents of which are incorporated herein by reference.

FIELD OF THE INVENTION

The invention relates to an electrically driven hydrofoil, and to an electrically driven hydrofoil board that is equipped with such a hydrofoil.

BACKGROUND

Hydrofoils allow a board to be lifted out of the water while traveling in order to reduce flow resistance. The hydrofoil has a strut and at least one wing situated thereon. The strut is fastened to the board. During travel operation, only a portion of the strut and of the wing(s) is submerged in the water. One example of such a hydrofoil board is found in EP 2 907 737 B2, among other sources.

For watercraft it is basically known to provide auxiliary drives. In many bodies of water, often only electric drives are permitted due to environmental considerations.

SUMMARY

An object of the invention is to provide options for equipping a hydrofoil of the above-mentioned type with an electric drive.

This object is achieved by a hydrofoil for fastening to a board in order to lift the board out of the water during travel operation, having at least one drive module, which as an autonomous unit is fastened to a portion of the hydrofoil that remains submerged in the water during travel operation, an electric battery, and an electrically operated propulsion device that is supplied with power by the electric battery.

It is thus possible to equip a conventional hydrofoil and a corresponding hydrofoil board with an electric drive as needed, without the need for modifications to the board or to the hydrofoil.

The approach offers the advantage that the hydrofoil or hydrofoil board may be used in the conventional manner, without an electric drive, for kiteboarding or jet skiing, but an electric drive module may also be attached as needed to allow the hydrofoil board to be optionally utilized independently of wind or a pulling device. The electric drive module may be controlled by remote control.

Due to the arrangement of the battery in the drive module, the handling characteristics during nonelectrical operation are not adversely affected by the weight of the battery. In addition, there is no need to provide an electrical connection between the propulsion device and the electric battery. The drive module thus represents an autonomous unit that may be attached to the hydrofoil as needed, but otherwise may be completely separate from the hydrofoil.

Advantageous embodiments of the invention are the subject matter of the further claims.

In one embodiment variant, the at least one drive module has a housing that encapsulates the electric battery, the propulsion device, and a control device for same. This results in an easily handled unit that may be quickly and easily fastened to the hydrofoil and later removed.

With regard to the limited energy capacity of a battery, one drive module may be quickly replaced with another, so that practically continuous electrical operation of a hydrofoil board may be achieved.

In one advantageous embodiment, it may also be provided that the housing has a charging plug for charging the battery present in the housing. This allows recharging without removing the battery.

However, it is also possible to remove the battery from the drive module and charge it separately.

According to another advantageous embodiment, the drive module is detachably fastened to the hydrofoil by means of a quick-connect device. This facilitates rapid installation and removal or replacement of drive modules.

The quick-connect device may be designed in particular as a clamping device.

The quick-connect device is preferably part of the particular drive module, so that the hydrofoil remains free of attachments for nonelectrical travel operation, which otherwise could adversely affect the flow behavior.

According to one embodiment variant, at least one drive module is provided which is situated behind a strut of the hydrofoil in the flow direction.

In addition, it is possible to arrange such a drive module next to a strut of the hydrofoil in the flow direction.

Furthermore, at least one drive module may be situated beneath a strut of the hydrofoil.

Integrating the drive module into a connecting rod between the strut of the hydrofoil and a rear wing is likewise possible.

In principle, a single drive module may be sufficient to generate enough propulsion to lift the board out of the water. However, it is also possible to detachably fasten two or more drive modules to the hydrofoil simultaneously, wherein a combination of the above-mentioned fastening positions is possible.

When two or more drive modules are used, an additional drive module may also be mounted directly beneath the board in order to come out of the water more quickly at the start.

In particular, for example two drive modules may be situated on opposite sides, next to a strut of the hydrofoil in the flow direction.

According to another advantageous embodiment, the propulsion device of the drive module is designed as a water jet drive. However, it is also possible to design the propulsion device as a propeller drive, wherein in particular a propeller drive with counter-rotating propellers is also possible.

The drive module is preferably oriented in the flow direction or parallel to the flow direction. However, it is also possible to provide at least one drive module that is fastened to the hydrofoil at an angle with respect to the flow direction.

In one embodiment variant, an adjustment device for changing the inclination angle of the drive module with respect to the flow direction in the installed state of the drive module, and situated on the housing of the particular drive module, is provided. It may thus be ensured that during nonelectrical operation the hydrofoil experiences no adverse effects with regard to flow behavior.

In another embodiment variant, it is provided to design the drive direction of the electrically operated propulsion device to be reversible so that forward and backward travel are possible.

In addition, an electrically driven hydrofoil board is provided which is equipped with an electrically driven hydrofoil.

BRIEF DESCRIPTION OF THE DRAWINGS

The invention is explained in greater detail below with reference to the exemplary embodiments illustrated in the drawings, which show the following.

DETAILED DESCRIPTION OF THE PREFERRED EMBODIMENTS

Figure 1:
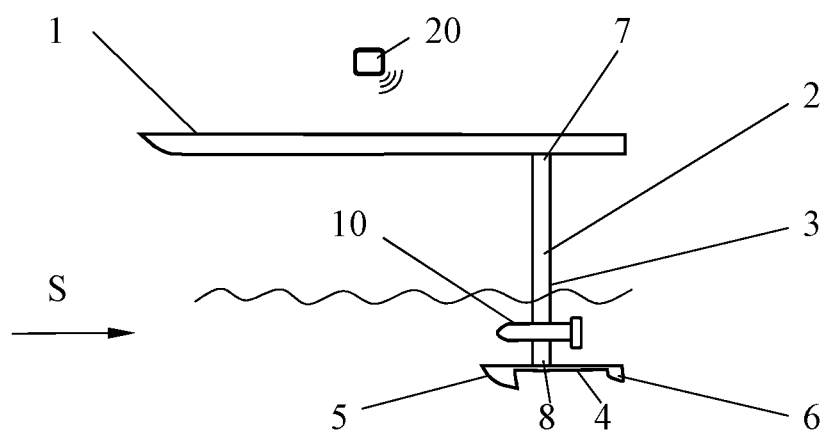
FIG. 1 shows a schematic illustration of a hydrofoil board with an autonomous drive module, according to a first exemplary embodiment.

The first exemplary embodiment shows a board 1 to which a hydrofoil 2 is fastened. The hydrofoil 2 has a strut 3, a connecting rod 4, a front wing 5, and a rear wing 6. These components are designed as separate parts, and are connected to one another in such a way that they may be individually replaced. It is thus possible to flexibly adapt the hydrofoil 2 to different purposes. However, it is also possible to integrate two or more components into a one-piece part if necessary.

The strut 3 is preferably made of a fiber composite plastic such as carbon fiber-reinforced plastic (CFRP) or glass fiber-reinforced plastic (GFRP). However, it may also be made of an aluminum alloy or a laminated composite. The strut 3 is fastened at a first end section 7 to the board 1, while the connecting rod 4 with the wing(s) 5 and 6 is situated at the opposite, second end section 8 of the strut 3. The wings 5 and 6 are preferably also made of fiber composite plastic, in particular carbon fiber-reinforced plastic (CFRP) or glass fiber-reinforced plastic (GFRP), or a laminated composite. They may be fastened to the connecting rod 4 as separate components.

During travel operation, above a certain speed the board 1 is completely lifted out of the water by the hydrofoil 2, while only a portion of the strut 3, the connecting rod 4, and the wing(s) 5, 6 remains submerged in the water.

Also apparent in FIG. 1 is a drive module 10, which as an autonomous unit is fastened to the portion of the hydrofoil 2 that remains submerged in the water during travel operation. This drive module 10 has an electric battery 11, and an electrically operated propulsion device 12 that is supplied with power by the electric battery 11.

The drive module 10 may be mounted on the hydrofoil 2 as needed and later removed.

Figure 7:
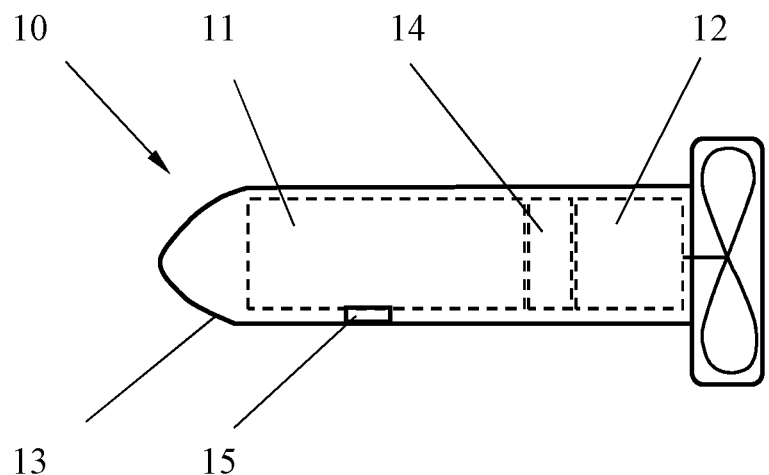
FIG. 7 shows a schematic illustration of an autonomous drive module in the form of a propeller drive.
Figure 8:
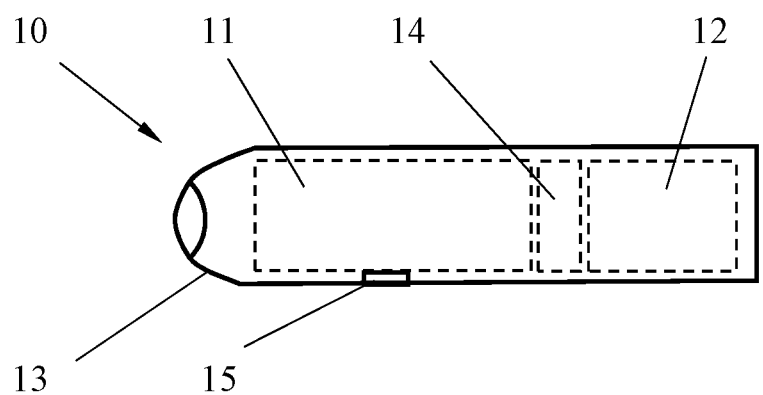
FIG. 8 shows a schematic illustration of an autonomous drive module in the form of a water jet drive.

The drive module 10 preferably has a housing 13 that encapsulates the electric battery 11, the propulsion device 12, and a control device 14 for same, as indicated in FIGS. 7 and 8.

For charging the electric battery 11, the housing 13 may have a charging plug 15 that is connected to the electric battery 11 within the housing 13. Alternatively or additionally, however, it is possible for the electric battery 11 to have a removable design for charging outside the housing 13.

In the exemplary embodiment in FIG. 1, the drive module 10 is situated next to the strut 3 of the hydrofoil 2 in the flow direction S.

Figure 2:
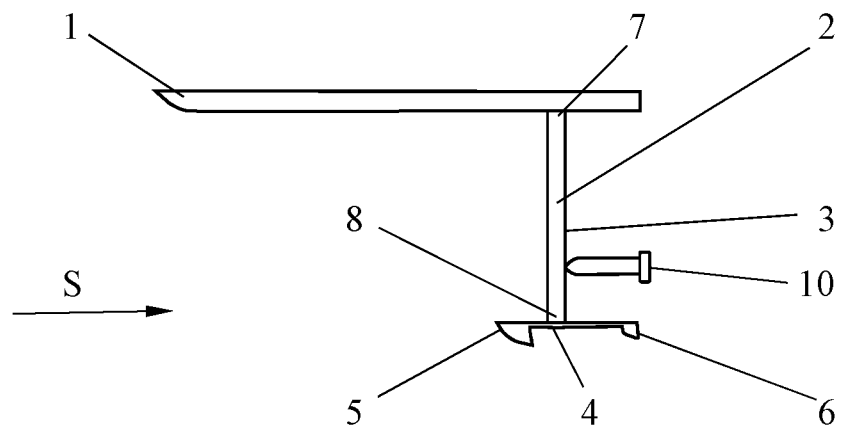
FIG. 2 shows a schematic illustration of a hydrofoil board with an autonomous drive module, according to a second exemplary embodiment.
Figure 3:
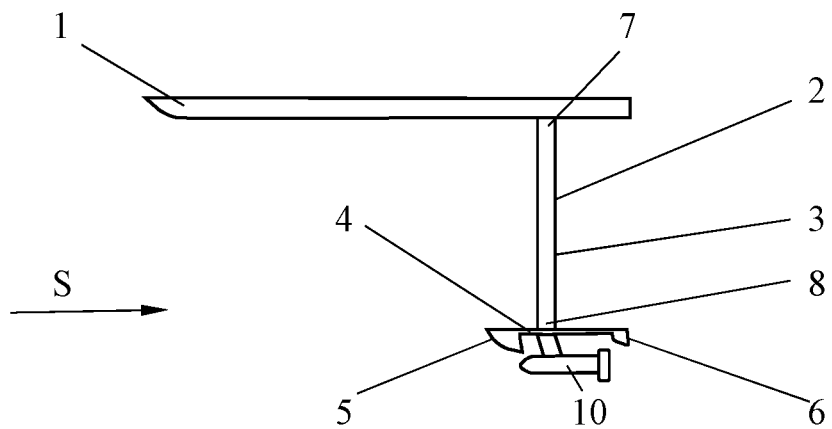
FIG. 3 shows a schematic illustration of a hydrofoil board with an autonomous drive module, according to a third exemplary embodiment.

It is also possible to arrange a drive module 10 behind the strut 3 in the flow direction S, as shown in FIG. 2. In addition, a drive module 10 may also be fastened to the hydrofoil 2 beneath the strut 3, as illustrated in FIG. 3 by way of example.

Figure 4:
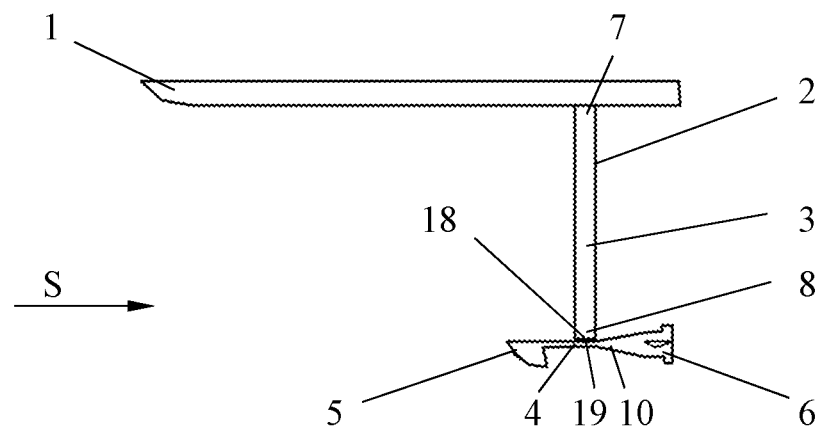
FIG. 4 shows a schematic illustration of a hydrofoil board with an autonomous drive module, according to a fourth exemplary embodiment.

Furthermore, it is possible to integrate a drive module 10 into the connecting rod 4, between the strut 3 and the rear wing 6, as indicated in FIG. 4. For this purpose, the drive module 10 may, for example, be inserted into the connecting rod 4, or the drive module 10 as such is simultaneously utilized as a connecting rod in order to connect at least one wing 5 or 6 to the strut 3. In the latter-mentioned case, a separate connecting rod may be dispensed with during electrical operation. In a modular embodiment variant, such a drive module 10 has an attachment 18 interface with the strut 3 which is compatible with an attachment 19 interface of a connecting rod 4 for nonelectrical operation.

Figure 5:
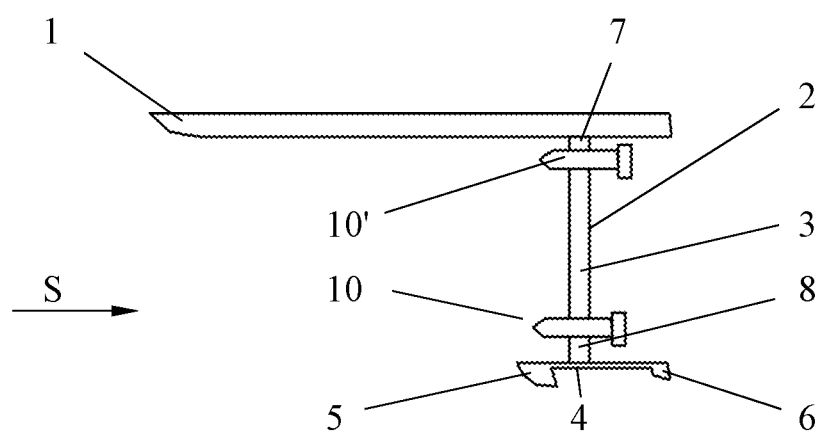
FIG. 5 shows an example for illustrating the attachment of two drive modules to a hydrofoil.

In each of the four exemplary embodiments mentioned above, only a single drive module 10 is detachably fastened to the hydrofoil 2. However, two or more drive modules 10 as autonomous units may also be provided on the hydrofoil 2. It is possible to combine the arrangement positions, illustrated in FIGS. 1 through 4, with one another. FIG. 5 shows, strictly by way of example, such an option in the form of an arrangement of two drive modules 10 next to the strut 3 of the hydrofoil 2 on both sides, in the flow direction.

In addition, it is possible to arrange two drive modules 10 on the hydrofoil 2 spaced apart from one another in the vertical direction. One of the drive modules 10' may optionally also be situated in an area that is provided for leaving the water during travel operation. FIG. 5 shows a combination of two drive modules 10, in which one of the drive modules 10' is mounted directly beneath the board 1 in order to come out of the water more quickly at the start. The top drive module may be switched off when it leaves the water. For example, the control device 14 of the drive module 10 in question may be appropriately configured for this purpose.

It is also possible to fasten a drive module on the hydrofoil 2 at an angle with respect to the flow direction S.

Figure 6:
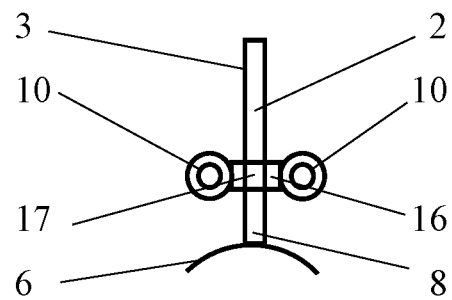
FIG. 6 shows a schematic illustration of a hydrofoil board with an autonomous drive module, according to a fifth exemplary embodiment.

FIG. 6 indicates an adjustment device 16 for changing the inclination angle of the drive module 10 with respect to the flow direction S, which allows the inclination angle to be changed when the drive module 10 is already mounted on the hydrofoil 2. This adjustment device 16 is preferably situated on the housing 10 of the drive module 10, so that it, together with the drive module 10, may be removed from the hydrofoil 2.

The drive module(s) 10 is/are detachably fastened to the hydrofoil 2 for simple, quick installation and removal.

In particular a quick-connect device 17 may be provided for this purpose. In one embodiment variant, this quick-connect device 17 may be designed as a clamping device.

The quick-connect device 17 is preferably part of the particular autonomous drive module 10, so that it may be removed from the hydrofoil 2 during disassembly of the drive module.

During nonelectrical operation, the hydrofoil 2 thus remains free of attachments that could adversely affect the flow around the hydrofoil, and thus, the handling characteristics of the hydrofoil board.

The hydrofoil board may thus on the one hand be used in the conventional manner, completely unimpaired by the electric drive, and on the other hand may be quickly and easily equipped with an electric drive as needed.

The drive module 10, as illustrated in FIG. 8 by way of example, may have a propulsion device that is designed as a water jet drive, or as illustrated in FIG. 7 by way of example, designed as a propeller drive. Since all components that are necessary for the electric drive are combined in the drive module 10, no modifications to the board 1 or to the hydrofoil 2 are required for electrification of the hydrofoil board. It is thus also possible in particular to retrofit existing hydrofoil boards with an electric drive.

The electric drive may be controlled via a remote control device 20 which, for example, is manually operated by the user.

If multiple drive modules 10 are present, they may be individually controlled via the remote control device 20, for example via control software that is implemented in the remote control device, or manually by the user.

The invention has been explained in greater detail above with reference to exemplary embodiments and further modifications. The exemplary embodiments and modifications serve to demonstrate the practicability of the invention. Individual technical features that have been explained above in the context of further individual features may also be implemented independently of same, and also in combination with additional individual features, even if this has not been explicitly described, provided that this is technically possible. Therefore, the invention is expressly not limited to the specific described exemplary embodiments and their modifications, but, rather, encompasses all embodiments that are defined by the patent claims.

LIST OF REFERENCE NUMERALS 1 board
2 hydrofoil
3 strut
4 connecting rod
5 wing (front)
6 wing (rear)
10 drive module
10' additional drive module
11 electric battery
12 propulsion device
13 housing
14 control device
15 charging plug
16 adjustment device for changing the inclination angle
17 quick-connect device
18 attachment interface
19 attachment interface
20 remote control device
S flow direction

What is claimed is:

1. An electrically driven hydrofoil for fastening to a board in order to lift the board out of the water during travel operation, comprising:
   at least one drive module, which is fastened to a portion of the hydrofoil that remains submerged in the water during travel operation,
   an electric battery, and
   an electrically operated propulsion device that is supplied with power by the electric battery,
   wherein said at least one drive module has a housing that encapsulates the electric battery, the propulsion device, and a control device for same, and
   wherein said at least one drive module forms an autonomous unit, which is detachably fastened to a strut of the hydrofoil either behind the strut of the hydrofoil in the flow direction, laterally aside the strut of the hydrofoil in the flow direction, or beneath the strut of the hydrofoil, for alternative use of the hydrofoil either unimpaired by the electric drive or equipped with the electric drive.

2. The electrically driven hydrofoil of claim 1, wherein the housing has a charging plug for charging the battery present in the housing.

3. The electrically driven hydrofoil of claim 1, wherein the drive module is detachably fastened to the hydrofoil by means of a quick-connect device.

4. The electrically driven hydrofoil of claim 3, wherein the quick-connect device is configured to secure the drive module to the hydrofoil by clamping.

5. The electrically driven hydrofoil of claim 3, wherein quick-connect device is part of the drive module.

6. The electrically driven hydrofoil of claim 1, wherein the electrically driven hydrofoil further comprises a wing, and a connecting rod connecting the wing to the strut, wherein said at least one drive module is integrated into the connecting rod.

7. The electrically driven hydrofoil of claim 1, wherein the electrically driven hydrofoil further comprises a wing, and a connecting rod connecting the wing to the strut, wherein said drive module is inserted into the connecting rod.

8. The electrically driven hydrofoil of claim 1, wherein the electrically driven hydrofoil further comprises a wing, and a connecting rod connecting the wing to the strut, wherein the drive module as such serves as the connecting rod that connects at least one wing to the strut.

9. The electrically driven hydrofoil of claim 1, wherein an additional drive module is situated in an area of the hydrofoil that is provided for leaving the water during travel operation.

10. The electrically driven hydrofoil of claim 1, wherein the propulsion device is designed as a water jet drive.

11. The electrically driven hydrofoil of claim 1, wherein the propulsion device is designed as a propeller drive.

12. The electrically driven hydrofoil of claim 1, wherein at least one of said at least one drive modules is fastened to the hydrofoil at an angle with respect to the flow direction.

13. The electrically driven hydrofoil of claim 1, wherein at least one of said at least one drive modules is tiltable for changing an inclination angle of the drive module with respect to the flow direction in the installed state of the drive module.

14. The electrically driven hydrofoil of claim 1, wherein said at least one drive module includes two or more drive modules which are detachably fastened to the hydrofoil simultaneously.

15. The electrically driven hydrofoil of claim 1, wherein said at least one drive module includes two drive modules situated on opposite sides, laterally aside the strut of the hydrofoil in the flow direction or are arranged on the hydrofoil spaced apart from one another in the vertical direction.

16. The electrically driven hydrofoil of claim 1, wherein the drive direction of the electrically operated propulsion device is reversible.

17. An electrically driven hydrofoil board, comprising
a board, and
an electrically driven hydrofoil, which is fastened to the board, the electrically driven hydrofoil having at least one drive module, which is fastened to a portion of the hydrofoil that remains submerged in the water during travel operation, an electric battery, and an electrically operated propulsion device that is supplied with power by the electric battery,
wherein said at least one drive module has a housing that encapsulates the electric battery, the propulsion device, and a control device for same, and
wherein said at least one drive module forms an autonomous unit, which is detachably fastened to a strut of the hydrofoil, either behind the strut of the hydrofoil in the flow direction, laterally aside the strut of the hydrofoil in the flow direction, or beneath the strut of the hydrofoil, for alternative use of the hydrofoil either unimpaired by the electric drive or equipped with the electric drive.

* * * * *